US011227437B2

(12) United States Patent
Zhang

(10) Patent No.: US 11,227,437 B2
(45) Date of Patent: Jan. 18, 2022

(54) THREE-DIMENSIONAL MODEL CONSTRUCTING METHOD, APPARATUS, AND SYSTEM

(71) Applicant: ALIBABA GROUP HOLDING LIMITED, Grand Cayman (KY)

(72) Inventor: Zhe Zhang, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/455,545

(22) Filed: Jun. 27, 2019

(65) Prior Publication Data

US 2019/0318537 A1 Oct. 17, 2019

Related U.S. Application Data

(63) Continuation of application No. PCT/CN2017/117356, filed on Dec. 20, 2017.

(30) Foreign Application Priority Data

Dec. 29, 2016 (CN) .......................... 201611245387.2

(51) Int. Cl.
*G06T 19/00* (2011.01)
(52) U.S. Cl.
CPC .................................... *G06T 19/00* (2013.01)
(58) Field of Classification Search
None
See application file for complete search history.

(56) References Cited

U.S. PATENT DOCUMENTS 9,178,934 B1 11/2015 Kolam
2013/0120367 A1* 5/2013 Miller ..................... G06T 15/20
345/419
2014/0336808 A1* 11/2014 Taylor ................... B29C 64/393
700/98

(Continued)

FOREIGN PATENT DOCUMENTS

CN 101916299 A 12/2010
CN 102201129 A 9/2011

(Continued)

OTHER PUBLICATIONS

First Chinese Office Action issued in Chinese Application No. 201611245387.2 dated Jan. 21, 2021, (12 pgs.).

(Continued)

*Primary Examiner* — Yi Wang
(74) *Attorney, Agent, or Firm* — Finnegan, Henderson, Farabow, Garrett & Dunner, LLP

(57) ABSTRACT

Embodiments of the disclosure provide methods and systems for generating a three-dimensional model. The method includes: receiving a first model submission request for generating an updated three-dimensional model from a first user client terminal, wherein the three-dimensional model is generated by modifying a first three-dimensional model having a model identifier, and the first model submission request includes a first modification to the first three-dimensional model; and storing the model identifier of the first three-dimensional model and the modification as model data of the updated three-dimensional model.

22 Claims, 10 Drawing Sheets

(56) References Cited

U.S. PATENT DOCUMENTS

2015/0339751 A1    11/2015  Velusamy
2016/0246899 A1*    8/2016  Hirschtick ............. G06F 30/17
2016/0253842 A1*    9/2016  Shapira .................. G06F 3/017
                                                         345/633

FOREIGN PATENT DOCUMENTS

| CN | 102750739 A | | 10/2012 |
|---|---|---|---|
| CN | 102957748 A | | 3/2013 |
| CN | 103902757 A | * | 7/2014 |
| CN | 103902757 A | | 7/2014 |
| CN | 103971414 A | | 8/2014 |
| CN | 104091215 A | | 10/2014 |
| CN | 105150530 A | | 12/2015 |
| CN | 105225268 A | | 1/2016 |
| CN | 105528808 A | | 4/2016 |
| CN | 106056666 A | | 10/2016 |
| WO | WO 2018/121367 A1 | | 7/2018 |

OTHER PUBLICATIONS

PCT International Search Report and Written Opinion dated Mar. 23, 2018, issued in corresponding International Application No. PCT/CN2017/117356 (13 pgs.).

European Patent Office Communication issued for Application No. 17886678.6 which encloses the extended European Search Report which includes pursuant to Rule 62 EPC, the Supplementary European Search Report (Art. 153(7) EPC) and the European search opinion, dated Nov. 26, 2019, 34 pages.

* cited by examiner

500

900

THREE-DIMENSIONAL MODEL CONSTRUCTING METHOD, APPARATUS, AND SYSTEM

CROSS REFERENCE TO RELATED APPLICATION

The disclosure claims the benefits of priority to International application number PCT/CN2017/117356, filed on Dec. 20, 2017, which claims the benefits of priority to Chinese application number 201611245387.2, filed Dec. 29, 2016, both of which are incorporated herein by reference in their entireties.

BACKGROUND

In the field of virtual reality application technologies, three-dimensional scenario models are used frequently to construct virtual worlds having a sense of reality. For a same scenario, different users can have their own reprocessing requirements. Therefore, there are generally multiple pieces of model data for the same scenario, and all the model data needs to be stored in a scenario model database to allow the different users to share and recreate the scenario models.

Conventionally, a scenario model is built mainly by a single-party building technology. That is, a model maker modifies existing scenario model data (hereinafter referred to as original model data) using a three-dimensional modeling tool (e.g., 3D Studio MAX), and then stores the whole scenario model data of a modified model in a scenario model base. Data of different models is completely separate in this model building technology. And even for a small change on a scenario model, a piece of complete data of the modified scenario model needs to be stored additionally. Therefore, a large storage space can be consumed. Moreover, any user can randomly edit the original model data, and the maker of the original model cannot achieve control over limits to model modification, e.g., for a case where some parts are unmodifiable, by subsequent users.

Therefore, how to research and develop a new three-dimensional model constructing method that can reduce scenario model base storage pressure and control the manner of modifying a scenario model is a technical problem to be solved in this field.

SUMMARY OF THE DISCLOSURE

In view of the foregoing problems, embodiments of this application are proposed to provide a relay device-based communication method, a communication method between a terminal and a base station, a relay device-based communication apparatus, and a communication apparatus between a terminal and a base station that address or at least partially solve the foregoing problems.

Embodiments of the disclosure provide a method for generating a three-dimensional model. The method can include: receiving a first model submission request for generating an updated three-dimensional model from a first user client terminal, wherein the three-dimensional model is generated by modifying a first three-dimensional model having a model identifier, and the first model submission request includes a first modification to the first three-dimensional model; and storing the model identifier of the first three-dimensional model and the modification as model data of the updated three-dimensional model.

Embodiments of the disclosure also provide a system for generating a three-dimensional model. The system can include: a memory storing a set of instructions; and at least one processor configured to execute the set of instructions to cause the system to perform: receiving a first model submission request for generating an updated three-dimensional model from a first user client terminal, wherein the updated three-dimensional model is generated by modifying a first three-dimensional model having a model identifier, and the first model submission request includes a first modification to the first three-dimensional model; and storing the model identifier of the first three-dimensional model and the modification as model data of the updated three-dimensional model.

Embodiments of the disclosure further provide a method for generating a three-dimensional model. The method can include: receiving a model submission instruction from a user for generating an updated three-dimensional model, wherein the updated three-dimensional model is generated by modifying a first three-dimensional model; acquiring modification to the first three-dimensional model; and sending a model submission request for the updated three-dimensional model to a server, wherein the modification to the first three-dimensional model is included in the first model submission request.

Embodiments of the disclosure also provide a system for generating a three-dimensional model. The system can include: a memory storing a set of instructions; and at least one processor configured to execute the set of instructions to cause the system to perform: receiving a model submission instruction from a user for generating an updated three-dimensional model, wherein the updated three-dimensional model is generated by modifying a first three-dimensional model; acquiring modification to the first three-dimensional model; and sending a model submission request for the updated three-dimensional model to a server, wherein the modification to the first three-dimensional model is included in the first model submission request.

In the three-dimensional model constructing method according to the embodiments of this application, a model submission request for a newly-built three-dimensional model sent by a user client terminal is received, wherein the newly-built three-dimensional model is constructed based on an original three-dimensional model; and modification information of the newly-built three-dimensional model relative to the original three-dimensional model as well as the model identifier of the original three-dimensional model are stored as model data of the newly-built three-dimensional model. Three-dimensional model data is stored hierarchically by referenced storage in this processing manner, and thus the pressure of storing a three-dimensional model can be reduced effectively.

By using the three-dimensional model constructing method according to the embodiments of this application, modification limit information of the newly-built three-dimensional model can further be carried by a model submission request and then stored. In this processing manner, a user cannot edit the model randomly while constructing a new model based on the model. Therefore, the manner of modifying the three-dimensional model can be controlled effectively.

DETAILED DESCRIPTION

Many specific details are described in the following descriptions to facilitate full understanding of this application. However, this application can be implemented in many other manners different from that described herein, and those skilled in the art may make similar generalizations without departing from the essence of this application. Therefore, this application is not limited by the specific implementations disclosed below.

The three-dimensional model constructing method according to embodiments of the disclosure includes: receiving a model submission request for a newly-built three-dimensional model sent by a user client terminal, wherein the newly-built three-dimensional model is constructed based on an original three-dimensional model; and storing modification information of the newly-built three-dimensional model relative to the original three-dimensional model carried by the request, and the model identifier of the original three-dimensional model as model data of the newly-built three-dimensional model. Three-dimensional model data is stored hierarchically by referenced storage, and thus the pressure of storing a three-dimensional model can be reduced effectively.

Figure 1:
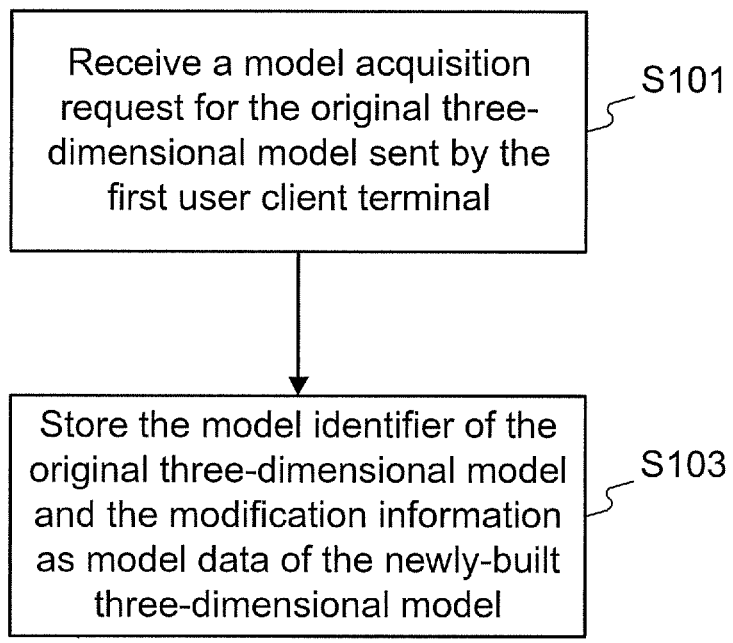
FIG. 1 is a flowchart of an exemplary three-dimensional model constructing method, according to embodiments of the disclosure.

FIG. 1 is a flowchart of an exemplary three-dimensional model constructing method 100, according to embodiments of the disclosure. Method 100 includes the following steps.

In step S101, a first model submission request for a newly-built three-dimensional model sent by a first user client terminal is received. The first user client terminal can be any type of device on which a three-dimensional modeling tool can run, e.g., a personal computer and a notebook computer. A three-dimensional model constructed by applying the three-dimensional model constructing method is not merely limited to a scenario model of a virtual reality world, e.g., a three-dimensional model of a house structure. It can also be a three-dimensional model of a general object in a non-virtual reality world, e.g., a three-dimensional model of an engine component of a vehicle.

The newly-built three-dimensional model is constructed based on an original three-dimensional model. In other words, the original three-dimensional model is the base model of the newly-built three-dimensional model. The newly-built three-dimensional model can also be used as a base model, on which the construction of another newly-built three-dimensional model is based.

Modification information of the newly-built three-dimensional model relative to the original three-dimensional model can be included in the first model submission request. The modification information reflects the difference between the newly-built three-dimensional model and the original three-dimensional model. The data of a complete three-dimensional model can include data of multiple model components. Therefore, the modification information can include at least one of model data corresponding to a new component of the newly-built three-dimensional model, location information of the new component in the newly-built three-dimensional model, a component identifier of a deleted component of the newly-built three-dimensional model, a component identifier of a data-modified component of the newly-built three-dimensional model, and the modified model data.

Moreover, dependency information can be further included in the first model submission request. The dependency information can indicate that the newly-built three-dimensional model is constructed based on the original three-dimensional model. For example, the model identifier of the original three-dimensional model or model data of the original three-dimensional model can be included in the first model submission request, and the model data can be as the model data of the original three-dimensional model.

The original three-dimensional model that the first user uses for the construction of the newly-built three-dimensional model in the first user client terminal can be acquired from a three-dimensional model base, constructed by the first user in the first user client terminal, or imported from another device. The original three-dimensional model can be provided by a device on which the method runs. The latter two types of original three-dimensional models are not stored in the three-dimensional model base, and thus can be referred to as new original three-dimensional models.

In these embodiments, the first user constructs a new model in the first user client terminal based on a three-dimensional model in the three-dimensional model base, so to form the newly-built three-dimensional model. To construct a new model based on a three-dimensional model in the three-dimensional model base, the first user client terminal can acquire data of existing three-dimensional models in the three-dimensional model base.

The first user client terminal can acquire the three-dimensional models in the three-dimensional model base. Acquiring the three-dimensional models in the three-dimensional model base can further steps as below: sending a model acquisition request for the original three-dimensional model to a device (e.g., a server) on which the method runs; receiving model data of the original three-dimensional model returned by the device; and generating the original three-dimensional model according to the received model data. Correspondingly, in the three-dimensional model constructing method, the model data of the original three-dimensional model can be returned to the first user client terminal according to the model acquisition request sent by the first user client terminal.

Figure 2:
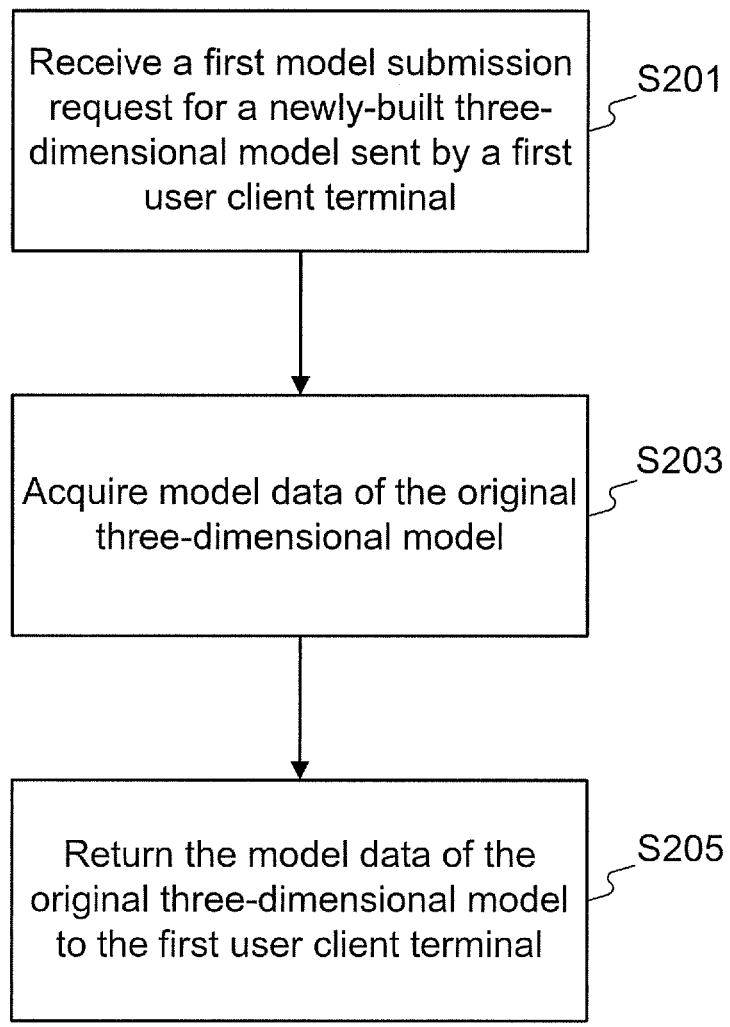
FIG. 2 is a flowchart of an exemplary three-dimensional model constructing method, according to embodiments of the disclosure.

FIG. 2 is a flowchart of a three-dimensional model constructing method, according to embodiments of the disclosure. In this embodiment, before step S101, method 100 further includes the following steps.

In step S201, a model acquisition request for the original three-dimensional model sent by the first user client terminal is received. Model identifier information of the original three-dimensional model is included in the model acquisition request.

In step S203, model data of the original three-dimensional model is acquired. A search is performed in a three-dimensional model base according to the model identifier of the original three-dimensional model, and model data of the original three-dimensional model is obtained.

It should be noted that the first user can construct a new model with a three-dimensional modeling tool (e.g., 3D Studio MAX or Maya). The three-dimensional modeling tool can only identify model data in a preset format, and a format of three-dimensional model data in the three-dimensional model base is a model-referenced format. For example, the three-dimensional model data can include model-referenced information in a first format and modification information in a second format. And, the first and second formats are inconsistent. As a result, the three-dimensional modeling tool cannot identify the three-dimensional model data in the three-dimensional model base. To open an existing three-dimensional model in the three-dimensional model base with the three-dimensional modeling tool to construct a new model based on the existing three-dimensional model, the data format of the acquired original three-dimensional model data can be converted in advance. For example, the data format of the original three-dimensional model data in the three-dimensional model base can be converted into a data format identifiable by the three-dimensional modeling tool.

The step of converting the data format of the original three-dimensional model data in the three-dimensional model base into a data format identifiable by the three-dimensional modeling tool can be implemented in a device end on which the method runs, or can be implemented in the first user client terminal.

In some embodiments, the step of converting the data format of the original three-dimensional model data in the three-dimensional model base into the data format identifiable by the three-dimensional modeling tool can be implemented in a device end on which the method runs. Therefore, step S203 can include the following specific steps: acquiring, according to the model identifier of the original three-dimensional model included in the model acquisition request, a model identifier of an earlier three-dimensional model on which the construction of the original three-dimensional model is based, and modification information of the original three-dimensional model; acquiring model data of the earlier three-dimensional model according to the model identifier of the earlier three-dimensional model; and generating model data of the original three-dimensional model according to the model data of the earlier three-dimensional model and the modification information relative to the earlier three-dimensional model.

In this processing manner, the model data of the original three-dimensional model returned to the client terminal is model data identifiable by the three-dimensional modeling tool.

In step S205, the model data of the original three-dimensional model is returned to the first user client terminal. After the model data of the original three-dimensional model is obtained in step S201 and step S203, the model data can be returned to the first user client terminal for loading and presentation, such that the first user can construct a new model based on the original three-dimensional model.

In some embodiments, modification limit information of the three-dimensional model can further be stored in the three-dimensional model base to control the manner of modifying the original three-dimensional model. The modification limit information can identify an unmodifiable model component or unmodifiable model data. The unmodifiable model component can include, for example, load bearing wall parts in a three-dimensional model of a house structure marked as unmodifiable. The unmodifiable model data can be designated directly as unmodifiable, and include, for example, data of load bearing wall parts in a three-dimensional model of a house structure marked as unmodifiable. The modification limit information can further define how the model component is modified. For example, it can be defined that the load bearing wall parts can merely have their color changed but cannot be deleted.

In this case, before step S205, the method can further include the following step: acquiring modification limit information of the original three-dimensional model. Correspondingly, step S205 is implemented by: returning the model data of the original three-dimensional model and the modification limit information of the original three-dimensional model to the first user client terminal. The first user client terminal can present the original three-dimensional model according to the modification limit information of the original three-dimensional model, and set the unmodifiable model components or the unmodifiable model data to an unmodifiable state, or display the unmodifiable model components in a highlighted manner (e.g., in red) to remind the user that these components cannot be modified.

The function of returning the model data of the original three-dimensional model to the first user client terminal according to the model acquisition request is implemented through the foregoing steps S201 to S205.

Moreover, for constructing a new model based on a three-dimensional model in the three-dimensional model base, data of the model serving as the original three-dimensional model can be collected in advance. Therefore, the three-dimensional model constructing method can further include the following step: collecting model data of the original three-dimensional model.

In some embodiments, the model data of the original three-dimensional model can be collected by: receiving a second model submission request for the original three-dimensional model from a second client terminal of a second user, the second model submission request including the model data of the original three-dimensional model; generating a model identifier of the original three-dimensional model; and storing a record of correspondence between the model identifier and the model data. The second user can be different from the first user. The second user can be a maker of the original three-dimensional model, and the first user can be a user of the original three-dimensional model and recreate the original three-dimensional model.

For example, the second user can be a real estate developer, and uses a three-dimensional modeling tool to construct three-dimensional model data of a house structure, and sends through a second user client terminal a model submission request for a three-dimensional model of the house structure to a device on which the method runs. A model identifier can be generated for the model after the request is received, and then a record of correspondence between the model identifier and the model data can be stored in a three-dimensional model base for other users to share and recreate. For example, when a decoration company accesses the original model as a first user, the decoration company can create a decorated model according to the original model, and when a householder accesses the decorated model as a first user, the householder can add commodity model information provided by commodity sellers and the like to the decorated model.

In some embodiments, modification limit information of the original three-dimensional model can also be included in the second model submission request. Correspondingly, the three-dimensional model constructing method can further include: storing modification limit information of the original three-dimensional model.

After the first model submission request for the newly-built three-dimensional model sent by the first user client terminal is received through step S101, the next step can be performed to store the model data of the newly-built three-dimensional model in a model-referenced format.

In step S103, the model identifier of the original three-dimensional model and the modification information are stored as model data of the newly-built three-dimensional model.

If the model identifier of the original three-dimensional model is included in the first model submission request, the model identifier and the modification information can be directly stored as the model data of the newly-built three-dimensional model in step S103.

If the model data of the original three-dimensional model is included in the first model submission request, and information indicating that the model data is the model data of the original three-dimensional model is also included. Before step S103, the method can further include: generating a model identifier of the original three-dimensional model; and storing a record of correspondence between the model identifier of the original three-dimensional model and the model data of the original three-dimensional model.

Figure 3:
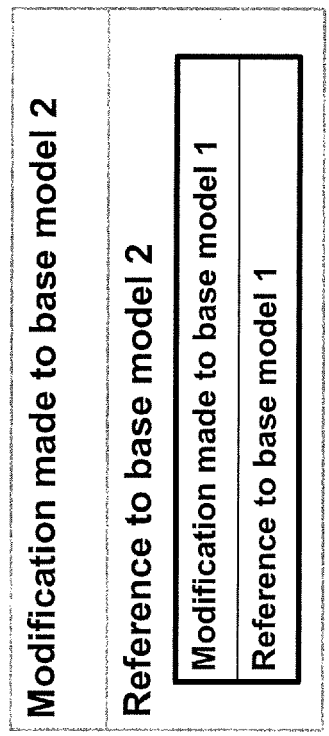
FIG. 3 is a schematic diagram of data storage in an exemplary three-dimensional model constructing method, according to embodiments of the disclosure.
Figure 3:
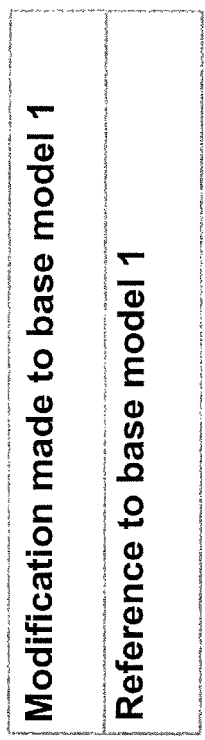

FIG. 3 is a schematic diagram of a data storage format of a three-dimensional model constructing method, according to embodiments of the disclosure. As shown in FIG. 3, each piece of model data includes: reference information for a base model (also known as an original model) and information on modifications made to the base model. The reference information can include the model identifier of the base model, and the information on modifications can include a model-referenced format.

Moreover, modification limit information of the newly-built three-dimensional model can also be included in the first model submission request. In this case, the three-dimensional model constructing method can further include: storing the modification limit information of the newly-built three-dimensional model. By storing the modification limit information of the newly-built three-dimensional model, the manner of modifying the newly-built three-dimensional model can be controlled when a new model is constructed subsequently based on the newly-built three-dimensional model.

Figure 4:
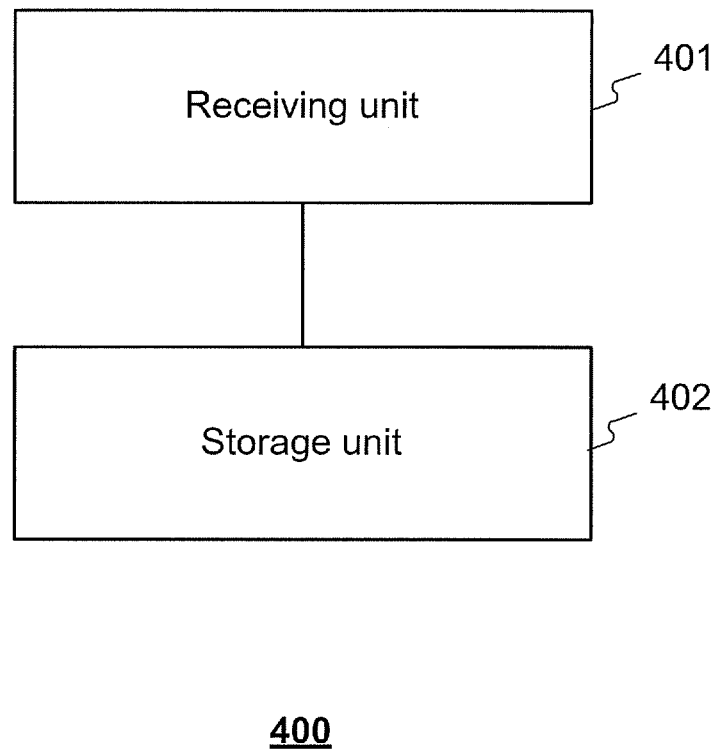
FIG. 4 is a schematic diagram of an exemplary three-dimensional model constructing apparatus, according to embodiments of the disclosure.

FIG. 4 is a schematic diagram of an exemplary three-dimensional model constructing apparatus 400, according to embodiments of the disclosure. As shown in FIG. 4, apparatus 400 can includes: a receiving unit 401 and a storage unit 402.

Receiving unit 401 can be configured to receive a first model submission request for a newly-built three-dimensional model sent by a first user client terminal, wherein the newly-built three-dimensional model is constructed based on an original three-dimensional model, and modification information of the newly-built three-dimensional model relative to the original three-dimensional model is carried by the first model submission request.

Storage unit 402 can be configured to store the model identifier of the original three-dimensional model and the modification information as model data of the newly-built three-dimensional model.

Figure 5:
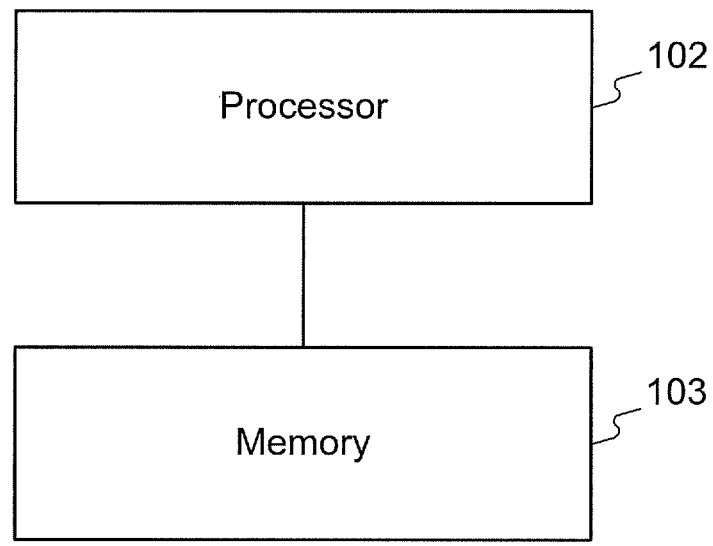
FIG. 5 is a schematic diagram of an exemplary electronic device, according to embodiments of the disclosure.

FIG. 5 is a schematic diagram of an exemplary electronic device 500, according to embodiments of the disclosure. Electronic device 500 can be a computer system, and include: at least one processor 102 and a memory 103.

Memory 103 can be configured to store a set of instructions.

At least one processor 102 can be configured to execute the set of instructions to cause device 500 to perform the above-mentioned method.

For example, device 500 can perform: receiving a first model submission request for a newly-built three-dimensional model sent by a first user client terminal, wherein the newly-built three-dimensional model is constructed based on an original three-dimensional model, and modification information of the newly-built three-dimensional model relative to the original three-dimensional model is carried by the first model submission request; and storing the model identifier of the original three-dimensional model and the modification information as model data of the newly-built three-dimensional model.

Figure 6:
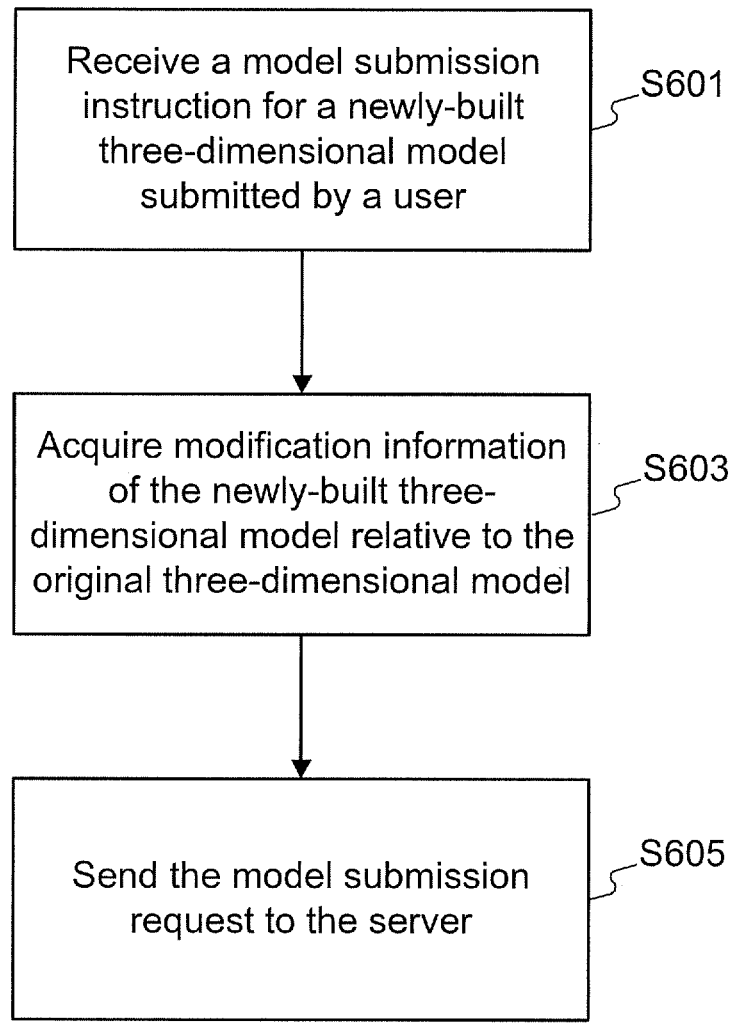
FIG. 6 is a flowchart of another exemplary three-dimensional model constructing method, according to embodiments of the disclosure.

FIG. 6 is a flowchart of another exemplary three-dimensional model constructing method 600, according to embodiments of the disclosure. Three-dimensional model constructing method 600 can include the following steps.

In step S601, a model submission instruction for a newly-built three-dimensional model submitted by a user is received. The newly-built three-dimensional model is constructed based on the original three-dimensional model. Before the user submits the model submission instruction, a new model first can be constructed based on the original three-dimensional model through the three-dimensional modeling tool, thus forming the newly-built three-dimensional model.

In some embodiments, an existing three-dimensional modeling tool, such as 3D Studio MAX or Maya, can be used to construct the model. The two tools are currently mainstream three-dimensional modeling tools with respective advantages and disadvantages, and they can be selected reasonably for use according to actual requirements.

The original three-dimensional model on which the construction of the newly-built three-dimensional model is based can be an original three-dimensional model from the three-dimensional model base, or a new original three-dimensional model constructed by the user through a three-dimensional modeling tool, or an original three-dimensional model imported by the user into the user client terminal from another device. The latter two types of original three-dimensional models are not stored in the three-dimensional model base, and thus can be referred to as new original three-dimensional models.

In some embodiments, the user constructs a new model in the user client terminal based on a three-dimensional model in the three-dimensional model base to form the newly-built three-dimensional model. In order to construct a new model based on a three-dimensional model in the three-dimensional model base, the client terminal of the user first needs to acquire three-dimensional model data in the three-dimensional model base.

The client terminal of the user can acquire the three-dimensional model data in the three-dimensional model base, and this can be implemented using the following specific steps: 1) sending a model acquisition request for the original three-dimensional model to a device; 2) receiving model data of the original three-dimensional model returned by the server; and 3) presenting the original three-dimensional model according to the received model data.

If modification limit information of the original three-dimensional model is further stored in the server, the step of receiving model data of the original three-dimensional model returned by the server can be implemented by: receiving the model data of the original three-dimensional model and the modification limit information of the original three-dimensional model returned by the server. In this case, the step of presenting the original three-dimensional model according to the received model data can include the following specific steps: 1) acquiring, according to the modification limit information, a component identifier of an unmodifiable model component in the original three-dimensional model or unmodifiable model data; and 2) presenting the original three-dimensional model according to the received model data, and setting the unmodifiable model component to an unmodifiable state during presentation of the original three-dimensional model.

If the server does not convert the data format of the original three-dimensional model data in the three-dimensional model base into a data format identifiable by the three-dimensional modeling tool, the model data received by the user client terminal will be model-referenced model data. That is, the model data includes a model identifier of a three-dimensional model on which the construction of the original three-dimensional model is based as well as modification information of the original three-dimensional model relative to the based three-dimensional model. In this case, the step of the user client terminal presenting the original three-dimensional model according to the received model data can include the following specific steps: 1) parsing the received model data to obtain parsed model data; and 2) presenting the original three-dimensional model according to the parsed model data.

The step of parsing the received model data to obtain parsed model data can be implemented by: first acquiring model data of the based three-dimensional model according to the model identifier of the based three-dimensional model; and then generating model data of the original three-dimensional model according to the model data of the based three-dimensional model and the modification information of the original three-dimensional model relative to the based three-dimensional model. After the data format of the original three-dimensional model data is converted into a data format identifiable by the three-dimensional modeling tool, the original three-dimensional model can be presented in the three-dimensional modeling tool, and thus the user can build a new model based on the model.

In some embodiments, the step of presenting the original three-dimensional model according to the received model data can be implemented by: presenting a virtual-reality original three-dimensional model according to the received model data.

In some embodiments, a virtual-reality original three-dimensional model can be presented to the user regardless of the data source of the original three-dimensional model. In some embodiments, a single-field-pattern model and a double-field-pattern model of the original three-dimensional model can be presented on the same screen, and the user viewing the original three-dimensional model by a virtual reality display device can experience the original three-dimensional model having a sense of space, and can further modify the original three-dimensional model by a virtual reality input device to construct a new model. Moreover, the manner of modifying the new model can also be limited by the virtual reality input device.

The virtual reality display device can be a virtual reality (VR) head-mounted display device, such as a VR head-mounted display (e.g., VR glasses or a VR helmet). By using the VR head-mounted display as an example, the device closes people's vision and hearing to the external environment, thus giving the user the feeling of being in a virtual environment. The display principle is that images for left and right eyes are displayed respectively on left-eye and right-eye screens, and a three-dimensional sense is generated in the brain after such differentiated information is acquired by the human eyes.

The virtual reality input device can map environment data of the real world to a virtual world. In other words, the virtual reality input device can input a user instruction to a VR system. Different from a keyboard and mouse, the virtual reality input device emphasizes a sense of immersion. The virtual reality input device can include gloves, a joystick, two joysticks, a full-body suit, and the like. With the development of virtual display technologies, there are increasing numbers of virtual reality input devices for users to use. For example, a conventional joystick combined with an inertial sensor and a vibration motor is used as a virtual reality input device, and such an input device is generally operated using a conventional button/rocker/touch panel and implements interaction by vibration.

When the user modifies the original three-dimensional model using the virtual reality input device, the received user instruction information can be further parsed to obtain a parsed user instruction. For example, the parsed user instruction can be a user instruction for modifying the color of the original three-dimensional model, adding new model data, or the like.

Referring to FIG. 6, after the model submission instruction for the newly-built three-dimensional model submitted by the user is received in step S601, in step S603, the modification information of the newly-built three-dimensional model relative to the original three-dimensional model can be acquired. In some embodiments, the modification information of the newly-built three-dimensional model relative to the original three-dimensional model can be acquired by: acquiring the model data of the newly-built three-dimensional model and the model data of the original three-dimensional model; and then comparing the two types of model data to obtain the modification information of the newly-built three-dimensional model relative to the original three-dimensional model.

If the original three-dimensional model has the modification limit information, after step S601, the method can further include the following steps: determining, according to the modification limit information of the original three-dimensional model, whether an unmodifiable model component in the original three-dimensional model is modified; and in response to the determination that the unmodifiable model component in the original three-dimensional model is modified, providing the user with prompt information of out-of-limit modification. In this processing manner, out-of-limit modification of the original three-dimensional model can be avoided effectively.

In step S605, the model submission request is sent to the server. The modification information of the newly-built three-dimensional model relative to the original three-dimensional model can be included the model submission request. The modification information can include at least one of: model data corresponding to a new component of the newly-built three-dimensional model relative to the original three-dimensional model; location information of the new component in the newly-built three-dimensional model; a component identifier of a deleted component of the newly-built three-dimensional model relative to the original three-dimensional model; a component identifier of a data-modified component of the newly-built three-dimensional model relative to the original three-dimensional model; and the modified model data.

Dependency information indicating that the newly-built three-dimensional model is constructed based on the original three-dimensional model can be further included in the model submission request. For example, the model identifier of the original three-dimensional model or model data of the original three-dimensional model can be included in the first model submission request, and the model data can be as the model data of the original three-dimensional model.

Moreover, when constructing the newly-built three-dimensional model, the user may mark each model component to be modifiable or unmodifiable, or may define how to modify the model component (e.g., only the location of the model component can be changed, and it cannot be deleted). Information related to the modification can be stored as the modification limit information of the newly-built three-dimensional model. The modification limit information can include: information of at least one unmodifiable model component. Therefore, before step S105, the method can further include: acquiring the modification limit information of the newly-built three-dimensional model. The modification limit information of the newly-built three-dimensional model can also be included in the model submission request.

The process of a user constructing a new model based on an original three-dimensional model and the process of a user client terminal sending a model submission request to a model storage server are illustrated below through a complete example. It is assumed that an original three-dimensional model is three-dimensional model data of a house structure constructed by a property developer through a three-dimensional modeling tool, and a decoration company constructs a modified house model based on the original three-dimensional model. The two pieces of model data are both stored in a three-dimensional model base of the model storage server in a model-referenced data format. A householder intends to purchase furniture on an e-commerce website. In this case, the householder can use a customized three-dimensional modeling tool (the tool is added with a model import function and a model submit function based on a conventional three-dimensional modeling tool) deployed in their personal computer to first import the decorated house model pre-stored in the model storage server, then import a three-dimensional model of a piece of furniture designated by the householder and pre-stored in an e-commerce server, add the three-dimensional model of the furniture into the decorated house model through the three-dimensional modeling tool, and designate the furniture model as modifiable, at which point the user's new model construction action ends. The new model is constructed based on the decorated house model, and a new model component "furniture model" is imported. At this time, the user can submit a model submission instruction for the newly-built three-dimensional model to the three-dimensional modeling tool. After receiving the model submission instruction, the three-dimensional modeling tool first acquires modification information of the newly-built three-dimensional model relative to the "decorated house model." The modification information includes model data of the "furniture model" and location information of the "furniture model" in the newly-built three-dimensional model. Then, the three-dimensional modeling tool can send a model submission request for the newly-built three-dimensional model to the model storage server. After receiving the request, the model storage server stores the model identifier of the "decorated house model" and the modification information as model data of the newly-built three-dimensional model. After that, if a family member of the householder wants to view the three-dimensional model constructed by the householder, the method according to the embodiment of this application can be used to first view the three-dimensional model constructed by the householder and to make modifications on this basis to construct a new model. It should be noted that the family member of the householder can only modify the furniture, for example, modify sofa A selected by the householder to sofa B. During the foregoing operation, the user can view the model through a virtual reality display device and construct a new model through a virtual reality input device.

Figure 7:
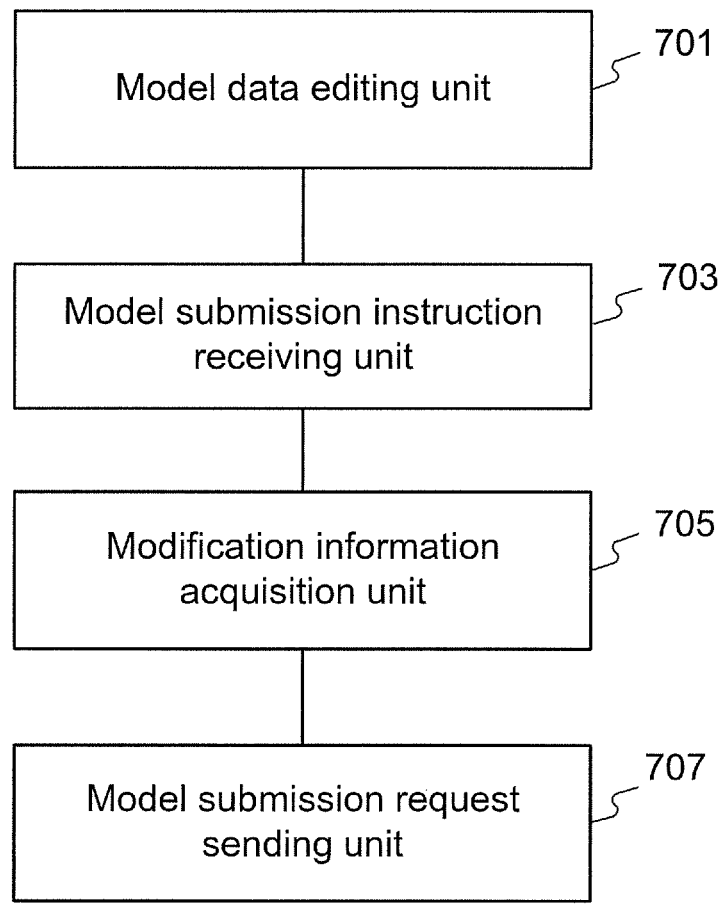
FIG. 7 is a schematic diagram of another exemplary three-dimensional model constructing apparatus, according to embodiments of the disclosure.

FIG. 7 is a schematic diagram of another three-dimensional model constructing apparatus 700, according to embodiments of the disclosure. Apparatus 700 can include a memory storing a set of instructions, and at least one processor configured to execute the set of instructions to causes apparatus 700 to perform the above-described methods. The memory and the at least one processor can be used to implement a plurality of units for apparatus 700, including a model data editing unit 701, a model submission instruction receiving unit 703, a modification information acquisition unit 705, and a model submission request sending unit 707.

Model data editing unit 701 can be configured to construct the newly-built three-dimensional model based on an original three-dimensional model.

Model submission instruction receiving unit 703 can be configured to receive a model submission instruction for the newly-built three-dimensional model submitted by a user.

Modification information acquisition unit 705 can be configured to acquire modification information of the newly-built three-dimensional model relative to the original three-dimensional model.

Model submission request sending unit 707 can be configured to send to the server a model submission request for the newly-built three-dimensional model. The modification information of the newly-built three-dimensional model relative to the original three-dimensional model can be included in the first model submission request.

Apparatus 700 can be constructed based on an existing three-dimensional modeling tool (e.g., 3D Studio MAX, or a game engine editor, or the like). For example, a game engine editor (such as Unity) is used as the model data editing unit 701, and the model submission instruction receiving unit 703, the modification information acquisition unit 705, and the model submission request sending unit 707 are constructed separately. Then, the model submission instruction receiving unit 703, the modification information acquisition unit 705, and the model submission request sending unit 707 are integrated into the game engine editor as plug-ins, thus constructing apparatus 700.

Figure 8:
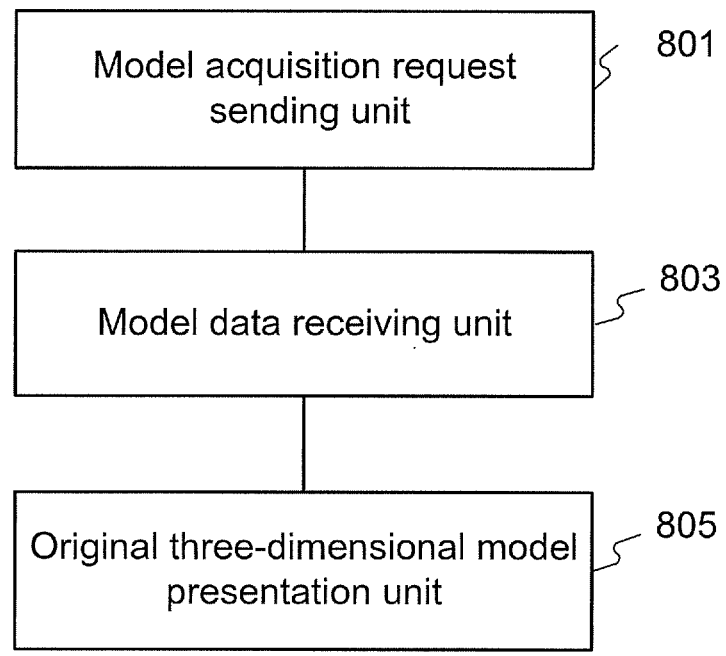
FIG. 8 is a schematic diagram of another exemplary three-dimensional model constructing apparatus, according to embodiments of the disclosure.

FIG. 8 is a schematic diagram of another three-dimensional model constructing apparatus 800, according to embodiments of the disclosure. Apparatus 800 can include a memory storing a set of instructions, and at least one processor configured to execute the set of instructions to causes apparatus 800 to perform the above-described methods. The memory and the at least one processor can be used to implement a plurality of units for apparatus 800, including a model acquisition request sending unit 801, a model data receiving unit 803, and an original three-dimensional model presentation unit 805.

Model acquisition request sending unit 801 can be configured to send to the server a model acquisition request for the original three-dimensional model.

Model data receiving unit 803 can be configured to receive model data of the original three-dimensional model returned by the server.

Original three-dimensional model presentation unit 805 can be configured to present the original three-dimensional model according to the received model data.

Model acquisition request sending unit 801, model data receiving unit 803, and original three-dimensional model presentation unit 805 can be integrated into the game engine editor as plug-ins, such that the user client terminal can import the original three-dimensional model from the server to construct a new model based on the original three-dimensional model.

In some embodiments, model data receiving unit 803 can be further configured to receive the model data of the original three-dimensional model and the modification limit information of the original three-dimensional model returned by the server.

In some embodiments, original three-dimensional model presentation unit 805 can include: an information acquisition sub-unit configured to acquire, according to the modification limit information, a component identifier of an unmodifiable model component in the original three-dimensional model; and a model presentation sub-unit configured to present the original three-dimensional model according to the received model data, and set the unmodifiable model component to an unmodifiable state during presentation of the original three-dimensional model.

In some embodiments, apparatus 800 can further include: a detection prompting unit configured to determine, according to the modification limit information, whether an unmodifiable model component in the original three-dimensional model is modified; and if the unmodifiable model component in the original three-dimensional model is modified, provide the user with prompt information about out-of-limit modification.

In some embodiments, the received model data includes model reference-type model data; and original three-dimensional model presentation unit 805 includes: a data parsing sub-unit configured to parse the received model data to obtain parsed model data; and a model presentation sub-unit configured to present the original three-dimensional model according to the parsed model data.

In some embodiments, original three-dimensional model presentation unit 805 is further configured to present a virtual-reality original three-dimensional model according to the received model data.

In some embodiments, apparatus 800 further includes: a modification limit information acquisition unit configured to acquire the modification limit information of the newly-built three-dimensional model. And the modification limit information of the newly-built three-dimensional model is further included in the model submission request.

In some embodiments, the modification limit information includes information of at least one unmodifiable model component.

In some embodiments, the modification information includes at least one of: model data and location information corresponding to a new component, a component identifier of a deleted component, and a component identifier of a modified component and modified model data.

Figure 9:
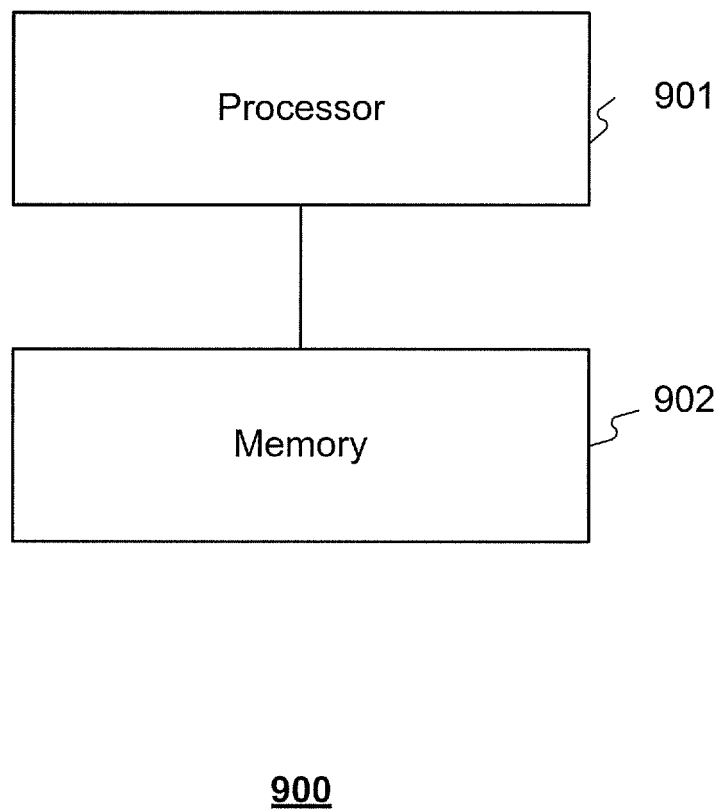
FIG. 9 is a schematic diagram of an exemplary electronic device, according to embodiments of the disclosure.

FIG. 9 is a schematic diagram of an electronic device 900, according to embodiments of the disclosure. Device 900 can include: a processor 901; and a memory 902.

Memory 902 is configured to store a program for implementing a three-dimensional model constructing method, and the device performs the following steps after it is powered on and the program of the three-dimensional model constructing method is run through the processor: receiving a model submission instruction for a newly-built three-dimensional model submitted by a user, wherein the newly-built three-dimensional model is constructed based on an original three-dimensional model; acquiring modification information of the newly-built three-dimensional model relative to the original three-dimensional model; and sending to a server a model submission request for the newly-built three-dimensional model, wherein the modification information of the newly-built three-dimensional model relative to the original three-dimensional model is carried by the first model submission request.

Figure 10:
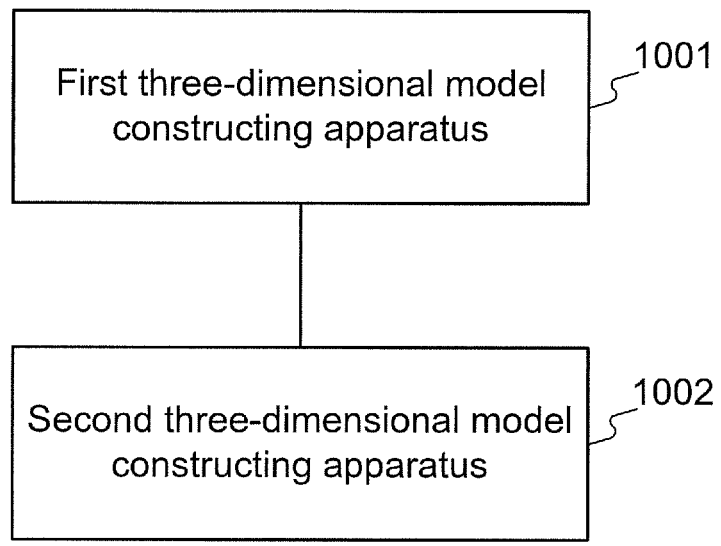
FIG. 10 is a schematic diagram of an exemplary three-dimensional model constructing system, according to embodiments of the disclosure.

FIG. 10 is a schematic diagram of an exemplary three-dimensional model constructing system 1000, according to embodiments of the disclosure. System 1000 can include a first three-dimensional model constructing apparatus 1001 and a second three-dimensional model constructing apparatus 1002. First three-dimensional model constructing apparatus 1001 can be deployed in a computer system that is capable of implementing the first three-dimensional model constructing method. Second three-dimensional model constructing apparatus 1002 can be deployed in a terminal device, such as a personal computer and a notebook computer.

For example, second three-dimensional model constructing apparatus 1002 can be deployed on a personal computer. The user first constructs a newly-built three-dimensional model based on an original three-dimensional model through three-dimensional modeling software. After the newly-built three-dimensional model is constructed, the user submits a model submission instruction for the newly-built three-dimensional model to second three-dimensional model constructing apparatus 1002. After receiving the model submission instruction, second three-dimensional model constructing apparatus 1002 can acquire modification information of the newly-built three-dimensional model relative to the original three-dimensional model, and send to a server a model submission request for the newly-built three-dimensional model, wherein the modification information of the newly-built three-dimensional model relative to original three-dimensional model is carried by the request. First three-dimensional model constructing apparatus 1001 is deployed on the server, receives the model submission request for the newly-built three-dimensional model sent by the user client terminal, and stores the model identifier of the original three-dimensional model and the modification information as model data of the newly-built three-dimensional model.

In embodiments of the disclosure, a model submission request for a newly-built three-dimensional model sent by a user client terminal is received, wherein the newly-built three-dimensional model is constructed based on an original three-dimensional model; and modification information of the newly-built three-dimensional model relative to the original three-dimensional model and the model identifier of the original three-dimensional model are stored as model data of the newly-built three-dimensional model. According to embodiments of the disclosure, three-dimensional model data is stored hierarchically by referenced storage, and thus the pressure of storing a three-dimensional model can be reduced effectively. Moreover, modification limit information of the newly-built three-dimensional model can further be carried by a model submission request sent by the user client terminal and then stored. In this processing manner, a user cannot edit the model randomly while constructing a new model based on the model. Therefore, the manner of modifying the three-dimensional model can be controlled effectively.

In a typical configuration, a computing device includes one or more processors (CPU), an input/output interface, a network interface, and a memory.

The memory may be in the form of volatile memory, random access memory (RAM), and/or non-volatile memory, such as read only memory (ROM) or flash RAM, in computer readable media. Memory is an example of a computer readable medium.

Computer readable media include non-volatile and volatile media as well as movable and non-movable media and may achieve information storage by means of any method or technology. Information may be computer readable instructions, data structures, program modules, or other data. Examples of computer storage media include, without limitation, phase change memory (PRAM), static random access memory (SRAM), dynamic random access memory (DRAM) and other types of random access memory (RAM), read-only memory (ROM), electrically erasable programmable read-only memory (EEPROM), flash memory or other memory technologies, compact disk read-only memory (CD-ROM), digital versatile disc (DVD) or other optical storage, cassette tape, magnetic tape/magnetic disk storage or other magnetic storage devices, or any other non-transmission medium. They may be used to store information accessible to the computing device. According to the definition in this text, computer-readable media do not include transitory media, such as modulated data signals and carriers.

Those skilled in the art should understand that the embodiments of this application may be provided as methods, systems, or computer program products. Therefore, the embodiments of this application may be implemented as a pure hardware embodiment, a pure software embodiment, or an embodiment combining software and hardware. Moreover, the embodiments of this application may be in the form of a computer program product implemented on one or more computer-usable storage media (including, but not limited to, magnetic disk memory, CD-ROM, optical memory and the like) that contain computer-usable program codes.

What is claimed is:

1. A method for generating a three-dimensional model, comprising:
    receiving a model submission instruction from a user for generating an updated three-dimensional model, wherein the updated three-dimensional model is generated by modifying a first three-dimensional model, wherein the first three-dimensional model is associated with model data comprising a model identifier of a base three-dimensional model on which the first three-dimensional model is built and first modification information of the first three-dimensional model relative to the base three-dimensional model;
    acquiring second modification information to the first three-dimensional model, wherein the second modification information reflects a difference between the first three-dimensional model and the updated three-dimensional model; and
    sending a model submission request for the updated three-dimensional model to a server, wherein the model submission request includes the second modification information and dependency information indicating the updated three-dimensional model being built on the first three-dimensional model.

2. The method according to claim 1, further comprising:
    sending to the server a model acquisition request for acquiring the first three-dimensional model;
    receiving the model data of the first three-dimensional model from the server; and
    presenting the first three-dimensional model according to the received model data.

3. The method according to claim 2, further comprises:
    receiving modification limit information of the first three-dimensional model from the server.

4. The method according to claim 3, wherein presenting the first three-dimensional model according to the received model data further comprises:
    acquiring a component identifier of an unmodifiable model component in the first three-dimensional model according to the modification limit information;
    presenting the first three-dimensional model according to the received model data; and
    setting the unmodifiable model component to an unmodifiable state during presentation of the first three-dimensional model.

5. The method according to claim 4, further comprising:
    determining, according to the modification limit information, whether the unmodifiable model component in the first three-dimensional model is modified; and
    in response to the determination that the unmodifiable model component in the first three-dimensional model is modified, indicating to the user that the modification is an out-of-limit modification.

6. The method according to claim 3, wherein the modification limit information comprises information of at least one unmodifiable model component.

7. The method according to claim 2, wherein the received model data comprises model-referenced model data, and presenting the first three-dimensional model according to the received model data further comprises:
    parsing the received model data to obtain parsed model data; and
    presenting the first three-dimensional model according to the parsed model data.

8. The method according to claim 2, wherein presenting the first three-dimensional model according to the received model data further comprises:
    presenting a virtual-reality first three-dimensional model according to the received model data.

9. The method according to claim 1, further comprising:
    acquiring modification limit information of the updated three-dimensional model, wherein the modification limit information of the updated three-dimensional model is included in the model submission request.

10. The method according to claim 1, wherein the second modification information comprises at least one of model data and location information corresponding to a new component, a component identifier of a deleted component, a component identifier of a modified component, and modified model data.

11. A system for generating a three-dimensional model, comprising:
    a memory storing a set of instructions; and
    at least one processor configured to execute the set of instructions to cause the system to perform:
        receiving a model submission instruction from a user for generating an updated three-dimensional model, wherein the updated three-dimensional model is generated by modifying a first three-dimensional model, wherein the first three-dimensional model is associated with model data comprising a model identifier of a base three-dimensional model on which the first three-dimensional model is built and first modification information of the first three-dimensional model relative to the base three-dimensional model;

acquiring second modification information to the first three-dimensional model, wherein the second modification information reflects a difference between the first three-dimensional model and the updated three-dimensional model; and sending a model submission request for the updated three-dimensional model to a server, wherein the model submission request includes the second modification information and dependency information indicating the updated three-dimensional model being built on the first three-dimensional model.

12. The system according to claim 11, wherein the first three-dimensional model is presented in a virtual reality scene.

13. A non-transitory computer readable medium that stores a set of instructions that is executable by at least one processor of a computer system to cause the computer system to perform a method for generating a three-dimensional model, the method comprising:

receiving a model submission instruction from a user for generating an updated three-dimensional model, wherein the updated three-dimensional model is generated by modifying a first three-dimensional model, wherein the first three-dimensional model is associated with model data comprising a model identifier of a base three-dimensional model on which the first three-dimensional model is built and first modification information of the first three-dimensional model relative to the base three-dimensional model;

acquiring second modification information to the first three-dimensional model, wherein the second modification information reflects a difference between the first three-dimensional model and the updated three-dimensional model; and sending a model submission request for the updated three-dimensional model to a server, wherein the model submission request includes the second modification information and dependency information indicating the updated three-dimensional model being built on the first three-dimensional model.

14. The non-transitory computer readable medium according to claim 13, wherein the set of instructions is further executed to cause to at least one processor of the computer system to perform:

sending to the server a model acquisition request for acquiring the first three-dimensional model;
receiving model data of the first three-dimensional model from the server; and
presenting the first three-dimensional model according to the received model data.

15. The non-transitory computer readable medium according to claim 14, wherein the set of instructions is further executed to cause to at least one processor of the computer system to perform:

receiving modification limit information of the first three-dimensional model from the server.

16. The non-transitory computer readable medium according to claim 15, wherein presenting the first three-dimensional model according to the received model data further comprises:

acquiring a component identifier of an unmodifiable model component in the first three-dimensional model according to the modification limit information;
presenting the first three-dimensional model according to the received model data; and
setting the unmodifiable model component to an unmodifiable state during presentation of the first three-dimensional model.

17. The non-transitory computer readable medium according to claim 16, wherein the set of instructions is further executed to cause to at least one processor of the computer system to perform:

determining, according to the modification limit information, whether the unmodifiable model component in the first three-dimensional model is modified; and
in response to the determination that the unmodifiable model component in the first three-dimensional model is modified, indicating to the user that the modification is an out-of-limit modification.

18. The non-transitory computer readable medium according to claim 15, wherein the modification limit information comprises information of at least one unmodifiable model component.

19. The non-transitory computer readable medium according to claim 14, wherein the received model data comprises model-referenced model data, and presenting the first three-dimensional model according to the received model data further comprises:

parsing the received model data to obtain parsed model data; and
presenting the first three-dimensional model according to the parsed model data.

20. The non-transitory computer readable medium according to claim 14, wherein presenting the first three-dimensional model according to the received model data further comprises:

presenting a virtual-reality first three-dimensional model according to the received model data.

21. The non-transitory computer readable medium according to claim 13, wherein the set of instructions is further executed to cause to at least one processor of the computer system to perform:

acquiring modification limit information of the updated three-dimensional model, wherein the modification limit information of the updated three-dimensional model is included in the model submission request.

22. The non-transitory computer readable medium according to claim 13, wherein the second modification information comprises at least one of model data and location information corresponding to a new component, a component identifier of a deleted component, a component identifier of a modified component, and modified model data.

* * * * *